Sept. 16, 1930.   A. P. THURSTON   1,775,977
AIRCRAFT
Filed Dec. 21, 1928   2 Sheets-Sheet 1
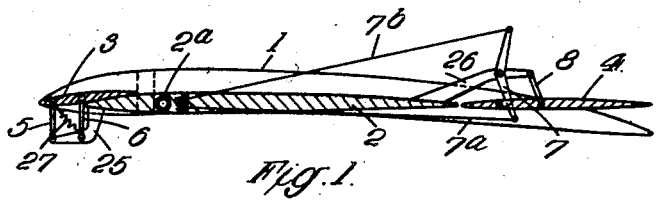
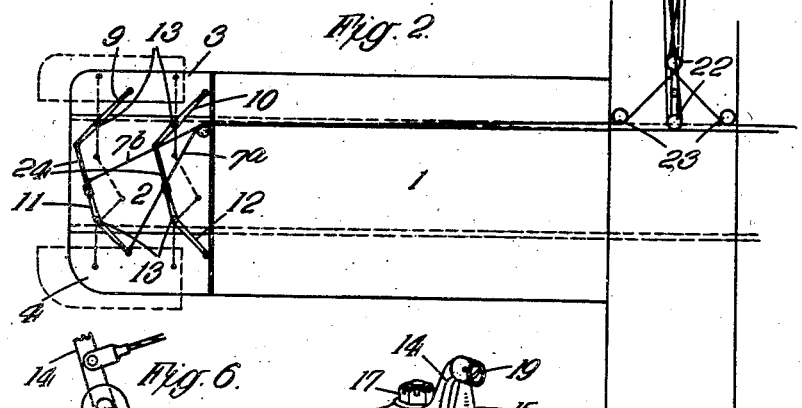
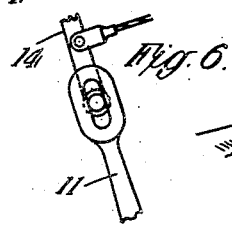
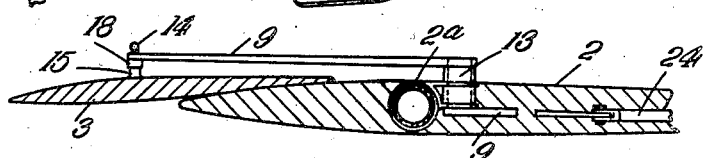
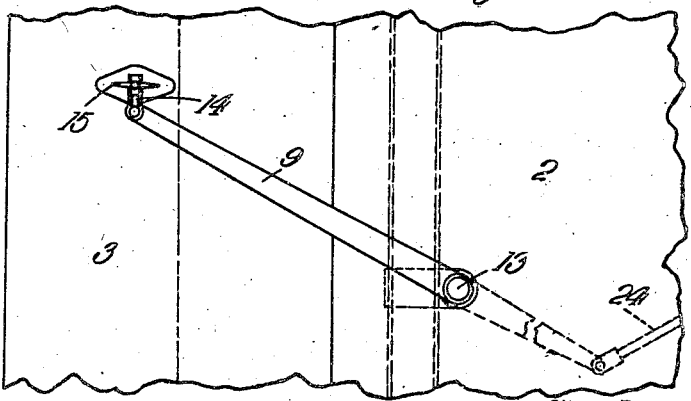
Albert Peter Thurston
INVENTOR;
By [signature]
his Attorney.

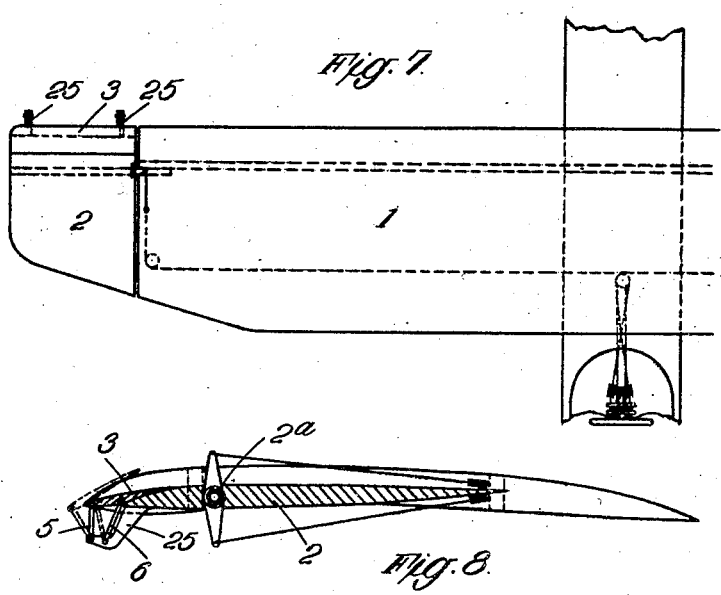
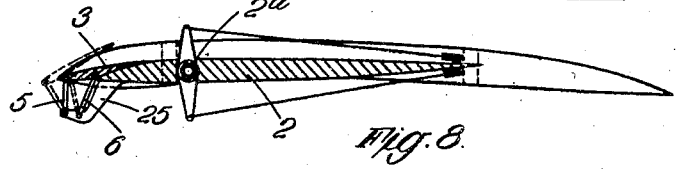
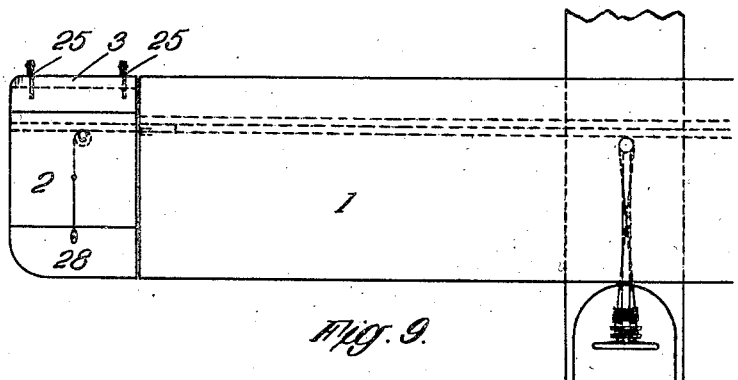
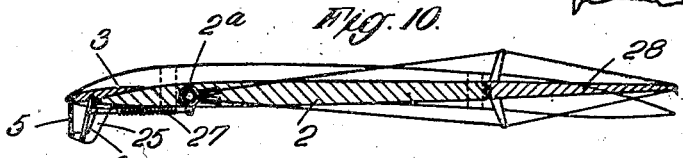
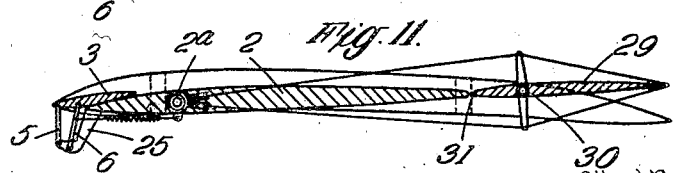

Patented Sept. 16, 1930

1,775,977

UNITED STATES PATENT OFFICE

ALBERT PETER THURSTON, OF LONDON, ENGLAND

AIRCRAFT

Application filed December 21, 1928, Serial No. 327,594, and in Great Britain February 16, 1928.

This invention relates to improved wings and planes and means for controlling such wings and planes of aircraft, and particularly relates to such craft provided with the means of control set forth in the prior British Patents Nos. 180,359 and 186,990.

In these specifications means for controlling the craft were provided, such as alulas, pinions, ailerons or small planes. placed "at the places of most efficient action along the front or tips of the wings whereby their action alters the aerodynamic properties of the wings themselves giving maximum lift when landing and maximum efficiency for fast flying".

The primary object of this invention is to provide improved means for controlling or stabilizing aircraft.

According to this invention aircraft are provided with wings each having a movable surface or main pinion projecting from its side with a projectable pinion or pinions or alulas mounted on its front edge to prevent burbling or stalling. Means may be provided for operating the said movable surfaces or main pinions either in opposite directions or in the same direction for the purpose of controlling the craft laterally or converting the wings into high lift or high speed wings at will.

The main pinion, plane or aileron hereinafter called the main pinion, is pivotally or rotatably mounted, towards its leading edge, on the side of the main wing projecting beyond its span so as to turn about an axis transverse to the direction of flight as in the prior British Patent 186,990 and a small plane, pinion or alula, hereinafter called an alula such as set forth in the prior British Patent No. 180,359 is mounted in front of and above the shaped leading edge of the main pinion to form with the said shaped leading edge a gap backwardly inclined upwards at a negative angle with the main pinion; means being provided for permitting variation of the amount of projection and/or the inclination of the said alula on one side only or on both sides of the craft simultaneously so that the alulas may be carried against the nose of the main pinion when at a low angle and automatically or otherwise extended when at a large angle.

The main pinion may be controlled by a rear flap or aileron or by a rear pinion or pinions, means being provided in the latter case for projecting the said pinion or pinions rearwardly and rotating it or them at a negative angle to the relative air so that the rear edge of the main pinion is depressed and its inclination to the air increased. The alula or alulas is or are preferably mounted on links carried by downward projections on the main pinion and the rear pinion or pinions is or are mounted on links carried by upward projections from the upper surface of the rear edge of the main pinion.

The means for operating the main pinion or the rear pinion or both the alula and the rear pinion, or the main pinion, alula and rear pinion, may be controlled from the joystick or control column in any known way such as that set forth in the prior British Patent No. 180,359.

The alula or alulas may be mounted on the main pinion in any of the ways set forth in the prior British applications Nos. 3,288/28 and 3,289/28 preferably on parallel links so as to be projectable parallel to the main pinion and its front edge simultaneously rotatable downwards and the rear pinion or pinions may be similarly mounted so as to be projectable backwards and its leading edge simultaneously rotatable downwards so that the main pinion may be placed at a positive angle with the rear pinion or pinions.

The invention will now be described with reference to the accompanying drawings, wherein:—

Figure 1 is a side view of a wing tip aileron in cross section.

Figure 2 is a plan of a modification.

Figure 3 is a cross section of a part of Figure 2 to a larger scale.

Figure 4 is a plan of Figure 3.

Figure 5 is a detail of the mechanism for operating the alulas.

Figure 6 is a detail of the control gear.

Figure 7 is a plan of a further modification.

Figure 8 is a cross section of Figure 7 to a larger scale.

Figure 9 is a plan of a still further modification.

Figure 10 is a cross section of Figure 9 to a larger scale.

Figure 11 is a cross section of yet another modification.

Referring to Figure 1, each wing 1 is provided with a set of three pinions consisting of a main pinion 2 pivoted or floating on the hollow shaft 2ª and having an automatically opening alula 3 mounted on its front edge by links 5, 6, and a movable pinion 4 at its rear edge by links 7, 8 for controlling the main pinion 2 in the relative air by means of cables 7ª, 7ᵇ.

In the modifications shown in Figures 2 to 6 inclusive the alula 3 and rear pinion 4 are mounted on links 9, 10, 11 and 12 respectively turning about axes 13 transverse to the main pinion and connected together by links 24 so that both the alula 3 and the rear pinion 4 are projected away from the sides of the main wing when they move away from the main pinion 1.

The said axes 13 may be inclined relatively to the main pinion and the alula and rear pinion in order that the alula and rear pinion may be at the desired position or angle relatively to the main pinion. The links 9 and 10 may be provided with a side extension 14 having a ball connection 19 with a lever 15 which is fixed to the alula 3. The lever 15 is pivoted by a trunnion 16 to a block 18 which in turn is pivoted by a trunnion 17 to the lever 9 or 10, the axes of the trunnions 16 and 17 being at right angles. The links 11 and 12 may be similarly connected to the rear pinion 4. By these means the alula 3 and rear pinion 4 may be rotated through desired angles as they move away from the main pinion 1. The rear pinion 4 is controlled from the joystick or control column 20 and control wheel 21 by cables 7ª, 7ᵇ, passing through the hollow shaft 2ª upon which the main pinion 1 floats and over pulleys 22 on the control column 20 and over fixed pulleys 23.

The alula 3 and rear pinion 4 may be interconnected so as to balance one another by any suitable mechanism, such as engaging toothed quadrants. The links 9 and 10 connecting the alulas 3 to the main pinion 2 may be shorter than those connecting the rear pinion 4. The interconnecting mechanism may be such that the alula 3 is not projected away from the main pinion 2 until the rear pinion 4 is moved a certain distance from the rear of the main pinion 2 whereby the alula 3 does not come into operation until the main pinion 2 is at a large angle.

The floating main pinion 2 may be provided as shown in Figures 1, 7, 8, 9, 10 and 11 with a pair of downwardly extending projections 25 from its front edge to each of which an alula 3 is connected by a pair of pivoted links 5, 6 which may be of different length to rotate the alula 3 the desired amount. Similarly the rear edge of the main pinion 2 may be provided, as shown in Figure 1, with a pair of upwardly extending projections 26 to each of which the rear pinion 4 is connected by pairs of similar links 7, 8 and it is controlled as previously described.

In the modification shown in Figures 9 and 10, the floating pinion 2 is provided with the usual aileron flap 28 hinged to its rear edge.

In the modification shown in Figure 11 the rear pinion 29 is pivoted so as to turn about an axis 30 behind its front edge 31.

The main wings may be provided with alulas 3 as set forth in the prior British applications Nos. 3,288/28 and 3,289/28 either free to open automatically without restraint or against a spring 27 or under control from the cockpit. An airvane or other air directional device may be provided as set forth in British application No. 3,291/28 for controlling the interconnection of the control gear of the rear pinion 4 with the alulas 3.

The operation of the control is as follows:—On the control lever 20 being operated sideways the rear pinion 4 on the opposite side is moved away from the rear of the floating main pinion 2 causing a downward force to be exerted on the said floating pinion 2 and thus increasing its inclination and exerting a lifting force on that side of the machine. At the same time the operation of the floating pinion 2 sets up a bank of compression and suction at the tip of the main plane which increases the lift over the whole wing thereby adding to the aileron effect. If the rear pinion 4 is operated to such an extent that the floating pinion 2 approaches its stalling angle the alula 3 is opened or automatically opens thereby permitting the inclination of the floating pinion to be increased with proportional increase of lift.

If the rear pinions 4 on both sides of the aircraft are operated simultaneously the wings are transformed from high speed efficiency wings to low speed wings suitable for landing.

It will be noticed that by floating the sets of pinions, 2, 3, 4 on a transverse axis as in the prior British Patent 186,990 the pinions run in relative air and their action is not affected, shielded or vitiated by the attitude of the machine itself and hence effective aileron control will be maintained even if the machine is stalled. By suitably proportioning the three pinion device as previously described the stalling angle of the wing may be increased to such an extent that it may be unnecessary to provide automatically opening or controlled alulas over the main wings.

Any convenient means or stops may be provided to limit the opening of the alulas and rear pinions.

I claim:—

1. Aircraft having a wing, a pinion of substantially airfoil contour pivotally mounted on the end of the wing, a small pinion pivoted at the rear of the first pinion, a nose vane movably mounted relative the entering edge of said first mentioned pinion to define a slot, means for moving the small pinion on its pivot so as to aerodynamically cause a change in the angular disposition of said first mentioned pinion, and means operatively associated with said small pinion for moving the vane relative the entering edge of said first mentioned pinion.

2. In aircraft, a main wing, a pinion of substantially airfoil contour pivotally mounted on the end of said main wing, a rearward flap and a forward alula each mounted on levers to pivot on axes transverse to the line of light, means connecting the levers for simultaneous operation whereby the flap and alula are simultaneously moved relative to the pinion, and means under the control of the operator for swinging said levers.

ALBERT PETER THURSTON.